United States Patent [19]

Hoagland et al.

[11] Patent Number: 5,002,116
[45] Date of Patent: Mar. 26, 1991

[54] ROTARY HEAT REGENERATOR

[75] Inventors: Lawrence C. Hoagland, Nashua, N.H.; Donald F. Steele, Cohasset, Mass.

[73] Assignee: Airxchange, Inc., Rockland, Mass.

[21] Appl. No.: 559,990

[22] Filed: Jul. 30, 1990

Related U.S. Application Data

[60] Continuation of Ser. No. 257,341, Oct. 13, 1988, abandoned, which is a division of Ser. No. 833,878, Feb. 25, 1986, Pat. No. 4,825,936, which is a continuation of Ser. No. 523,139, Aug. 15, 1983, abandoned.

[51] Int. Cl.$^5$ ............................................. F28D 19/00
[52] U.S. Cl. ............................................. 165/9; 165/54
[58] Field of Search ............................................. 165/9

[56] References Cited

FOREIGN PATENT DOCUMENTS 709638  6/1954  United Kingdom .................... 165/9
2119037 10/1983  United Kingdom .................... 165/9

Primary Examiner—Albert W. Davis, Jr.
Attorney, Agent, or Firm—Schiller, Pandiscio & Kusmer

[57] ABSTRACT

A rotary heat regenerator comprises a regenerator matrix mounted for rotation in a central aperture of a housing wall, and an improved seal disposed in the annular gap between the matrix and the housing wall. The seal includes (a) a first portion of pile-like material which is secured to the peripheral surface of the matrix, and (b) a second portion of pile-like material which is secured to the housing wall such that the two interact to provide a seal while allowing the matrix to rotate in the aperture.

10 Claims, 6 Drawing Sheets

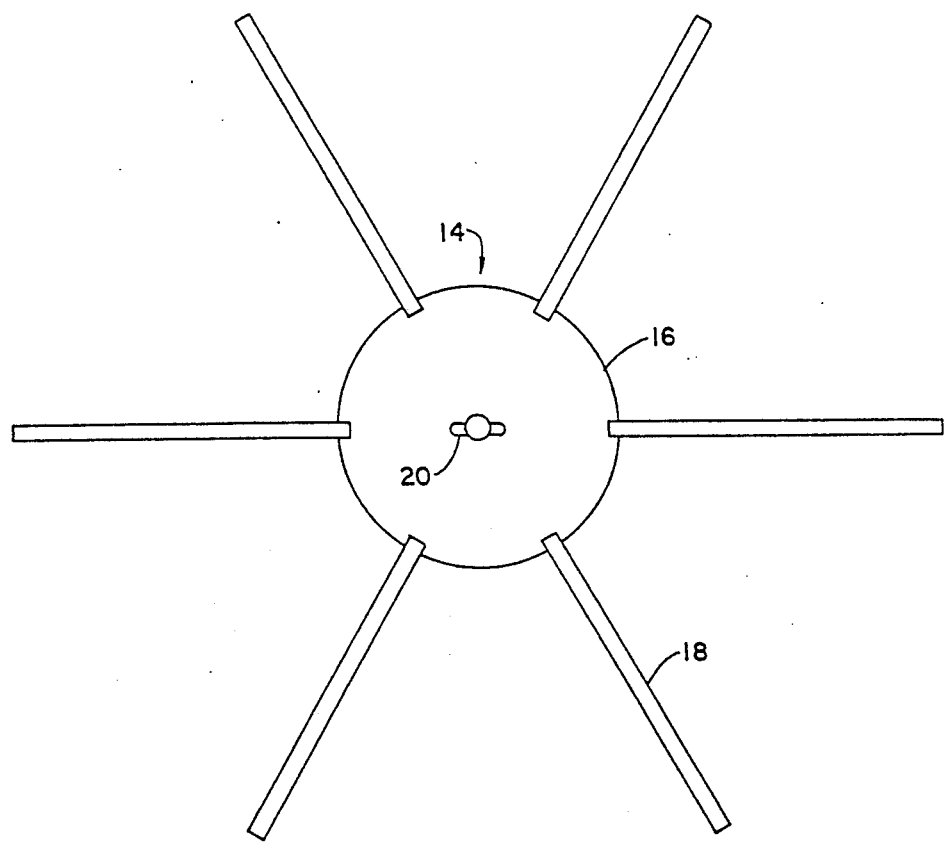

ROTARY HEAT REGENERATOR

This is a continuation of copending application Ser. No. 07/257,341 filed on Oct. 13, 1988, now abandoned, which is a division of U.S. patent application Ser. No. 833,878, filed Feb. 25, 1986, now U.S. Pat. No. 4,825,936 granted May 2, 1989, which in turn is a continuation of U.S. application Ser. No. 523,139, filed Aug. 15, 1982, now abandoned.

BACKGROUND OF THE INVENTION

In the manufacture of rotary heat regenerators for residential use, it has been found possible to form the regenerator wheel from a spiral wound strip of plastic for reasons of economy, and it has been found unexpectedly that such a wheel will have a heat exchange efficiency greater than that of a wheel made of an expensive metal such as stainless steel.

However in the manufacture of such a matrix utilizing a plastic strip, the strip cannot be wound too tightly since excessive tension during winding will reduce the size of the air passages and reduce the efficiency of the matrix. For this reason such a matrix has little strength, particularly in a direction transverse to the plane of the matrix.

In residential use, the gas passages of the matrix may tend to clog with dust, grease, lint, animal hair, or the like, and therefore it is desirable that the wheel should be easily removed for either cleaning or replacement, and that the portion of the structure that must be removed or replaced comprise as little of the wheel structure as possible, for reasons of economy.

Since two separate blowers are required to form the two separate air streams, and means must be provided for rotation of the matrix wheel, the manufacture of such regenerators has been unduly expensive, limiting their use in residential applications.

SUMMARY OF THE INVENTION

This invention provides a rotary heat regenerator which includes a regenerator wheel in which the regenerator matrix is easily removed for replacement or cleaning, and in which only the actual matrix structure is discarded when replacement is required, without the necessity of removing the matrix drive or support mechanism.

In one embodiment of the invention, the matrix includes a spiral of plastic material wound on a hub formed of a ring of material such as plastic or cardboard tubing and lies in a generally horizontal position when mounted in the regenerator, on a driving mechanism which comprises a series of support spokes radiating from a central driving hub.

In another embodiment of the invention the lower side of the regenerator matrix is provided with radial grooves extending from the hub of the matrix, the grooves being positioned and dimensioned to receive the driving spokes.

In another embodiment of the invention the grooves in the matrix are formed with a heated tool, so that a substantially continuous fused layer is formed on the surface of the groove to maintain the radial dimensions of the matrix and to provide the matrix with rigidity for handling during manufacture, assembly, and use.

In another embodiment of the invention the periphery of the wheel is provided with a strip of material having a pile or pile-like surface which acts as a partial seal to restrict air flow through the gap between the periphery of the wheel and a surrounding housing, serves as a regenerator matrix for any air that passes through the pile, and accomodates for any lack of concentricity between the wheel and the housing.

To reduce the cost of the assembly, the components are arranged so that a single driving motor operates both blowers and also rotates the matrix wheel.

BRIEF DESCRIPTION OF THE DRAWINGS

FIG. 7 is a top plan view of the matrix support.

FIG. 8 is a view in side elevation of the matrix support.

DESCRIPTION OF THE ILLUSTRATED EMBODIMENT

Figure 1:
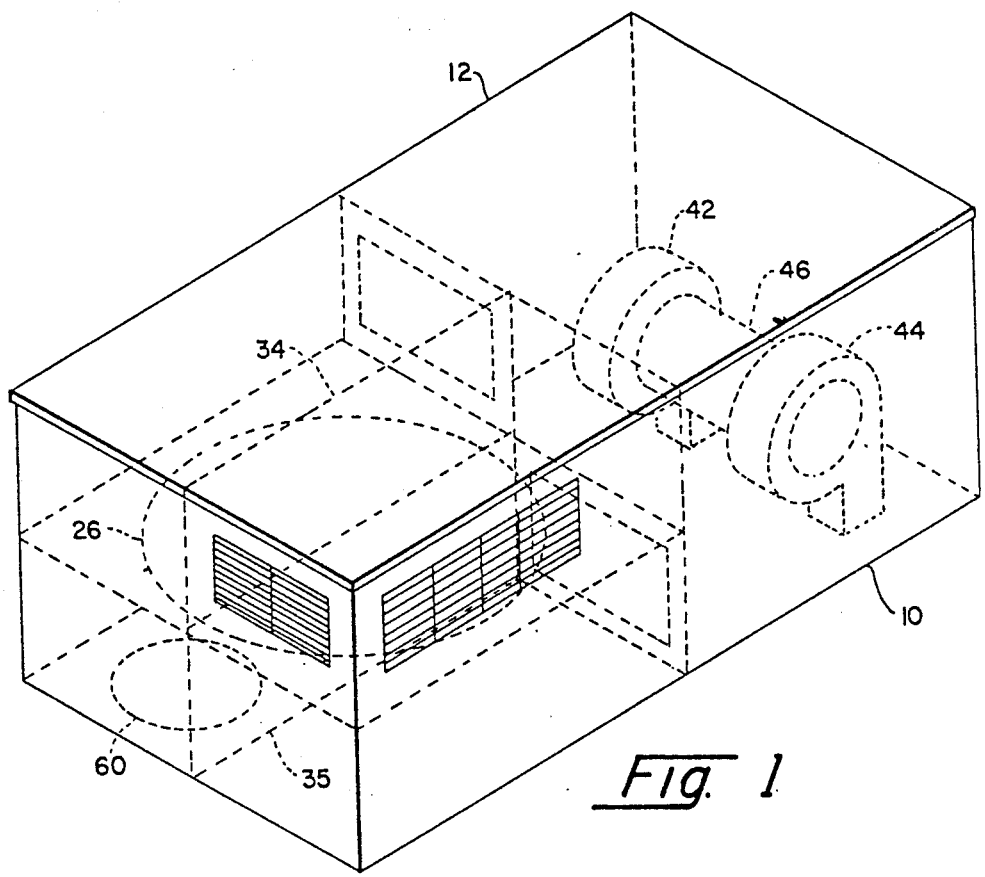
FIG. 1 is a perspective view of the exterior of the housing of a rotary heat regenerator embodying the features of the invention.

Referring to the drawing, there is illustrated a rotary heat exchanger which is adapted for residential use, and comprises an enclosure 10 having a removable top cover 12, and suitable apertures for air flow into and out of the cabinet, as will appear hereinafter.

Disposed within the cabinet is a regenerator matrix support 14 which comprises a hub 16 with a series of arms 18 extending radially therefrom. The hub 16 has a central aperture 20 allowing the hub to be mounted onto a vertical drive shaft 22, which shaft may be rotated by any suitable means such as by a belt driven pulley 24.

Figure 12:
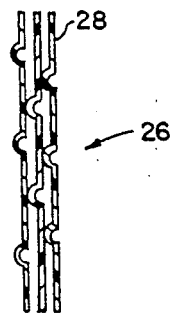
FIG. 12 is a view in section taken on line 12—12 of FIG. 9.

The regenerator matrix 26, in a preferred embodiment, is formed of two continuous spiral wound layers of strips formed of plastic of a type which is capable of being heat sealed, such as polystyrene. A first strip 28 has suitable surface projections to provide gas passages between the strip layers, and a second strip 29 is flat, without projections. (See FIG. 12.) Many types of embossments or deformations of strips in spiral wound matrices for such heat exchangers are known in the art. However, it is preferred that the strips and the gas passages formed between the strips have dimensions such that the parameter $L^2/K_s S t$ is greater than about 7 hr.ft.deg.F/BTU, where L is the width of the strip (i.e., the thickness of the matrix), $K_s$ is the heat conductivity of the material of which the strip is made, S is the spacing between the strips, and t is the thickness of the strip.

A rotary regenerator matrix having dimensions according to the above formula is disclosed and claimed in co-pending U.S. application Ser. No. 320,305 filed Nov. 12, 1981, abandoned in favor of continuation application Ser. No. 714,685 filed Mar. 21, 1985.

In a preferred embodiment of the invention, the strip 28 is wound around a hub 30 formed of plastic or cardboard, the hub having an internal diameter which is substantially equal to the outside diameter of the support hub 16 so that the matrix may be easily assembled onto and removed from the support hub.

A spiral wound matrix wheel cannot be wound tightly, since excessive tension during winding will reduce the size of the gas passages and reduce the efficiency of the matrix. For this reason the matrix wheel 20 has little strength, particularly in a direction perpendicular to the plane of the matrix face.

Therefore the radial arms 18 of the support 14 are provided to underlie the assembled matrix to provide support thereto, and preferably have a length at least great enough to reach the outer periphery of the matrix.

In a preferred embodiment of the matrix, to allow the arms 18 to impart rotation to the matrix and to provide stability to its shape, the underside thereof has a series of radial grooves 32 which are dimensioned and positioned to allow the radial arms 18 to seat therein flush with the lower surface of the matrix when the matrix is placed onto the support hub.

The radial grooves may be made in any convenient manner, but preferably are made in the manner disclosed and claimed in co-pending application Ser. No. 317,756 filed Nov. 3, 1981, now U.S. Pat. No. 4,432,409 issued on Feb. 21, 1984. As disclosed therein, a regenerator matrix may be made from a spiral wound strip of thermoplastic, and may be re-inforced by forming radial fused portions by the application of a heated tool of suitable shape to the side surface of the matrix. The heated tool not only forms a groove having a cross-sectional shape corresponding to the cross-sectional shape of the tool, but also causes adjacent layers of the strip to become fused together. This results a substantially continuous layer of fused plastic being formed in the groove surface, thereby providing rigidity to the matrix to facilitate handling, and the circumference of the matrix being maintained in a circular configuration. However it is also possible to form the grooves by a milling operation.

To control the air flow through the matrix, a seal assembly is provided on each face of the matrix. In the illustrated embodiment the seal assemblies comprise upper and lower plates 34 and 35 which extend between the wheel and the upper and lower surfaces of the housing 10 and generally bisect the face of the matrix. They also extend laterally between the housing walls so that each half of the matrix is in a separate chamber through wich incoming and outgoing air can flow independently of each other.

Elongated flexible seals 36 are fastened to the edge of the seal plates 34 and 35 on each side of the center of the matrix wheel and on opposite sides of the plate so that the flexible seals 36 drag against the surface of the wheel as the wheel rotates.

In a preferred embodiment of the invention, the matrix wheel 26 is disposed within an aperture 37 of a seal plate 38, and the matrix wheel is provided with a strip of pile or brush-like material 39 on the periphery. The matrix wheel and the aperture 37 are so dimensioned that the ends of the pile brush lightly against the adjacent wall surface of the seal plate aperture.

Although the pile does not completely seal the space between the matrix periphery and the surrounding wall of the seal plate, it greatly reduces the air leakage through this space, and the pile itself acts as a heat recovery matrix for air leaking through the pile, since it rotates with the matrix wheel through both air streams alternately.

The pile also allows a greater tolerance in the fit of the matrix in the aperture 37 and compensates for lack of concentricity in the matrix. Since the pile is attached to the matrix, it may be cleaned when the matrix is removed for cleaning.

Although the pile may cause some wear on the wall forming the aperture 37, such wear will be to only a limited depth, until the pile barely touches the wall surface, after which time no further wear will occur, and the pile will thereafter still perform its sealing and heat recovery function.

In some instances it may be desirable to place the pile strip on the surface of the wall of the aperture 37, in which position it will serve as a partial seal and will accommodate a lack of concentricity of the matrix. If desired, a strip of pile may be placed on both the wall of the aperture and on the matrix, with said two strips being either in the same plane or overlapping.

For use as a residential heat recovery ventilator it is desirable that the matrix wheel be easily removable for cleaning or for replacement. For this purpose at least the upper seal plate 34 may be mounted in tracks 40 to enable it to be lifted off of the top of the matrix after the cover 12 is removed. The matrix wheel may be lifted off of the support 14, or the support may be lifted off of the shaft 22 to transport the matrix to another location for cleaning or disposal.

The fact that the matrix wheel is mounted for rotation in a horizontal plane enables it to be securely supported by the arms 18 and eliminates the need for other retaining means covering the top of the wheel. If desired a small retaining plate 64 may be assembled onto the upper end of the shaft 22, which is large enough to lap over the hub 30 of the matrix.

Regenerators of the type described herein are used to ventilate a living space without substantial loss of heat, by forcing inside air through one half of the rotating matrix, which absorbs heat from the air, which is then exhausted to the outside, and by drawing in outside air, which is forced through the other half of the rotating wheel, where it picks up heat from the matrix and is discharged into the living space. When the living space is air-conditioned, the device allows the living space to be ventilated without substantial increase of the load on the air-conditioning system.

To provide the two airstreams, two blowers are required, and means must also be provided for rotating the matrix wheel. In the illustrated embodiment this is accomplished in an economical manner by providing two blowers 42, 44 and a motor 46, all either mounted on a common shaft or on co-axial shafts connected together. The shaft 48 is also provided with a drive pulley 50 which, through suitable speed reducing pulleys 52 and 54 drives the pully 24 on the matrix wheel shaft 22. Thus all components of the device are driven by a single motor.

Figure 2:
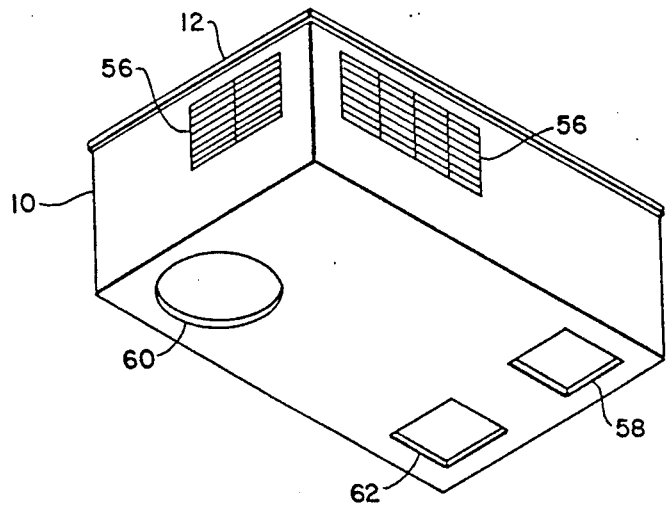
FIG. 2 is a perspective view of the device of FIG. 1 showing the lower surface thereof.
Figure 3:
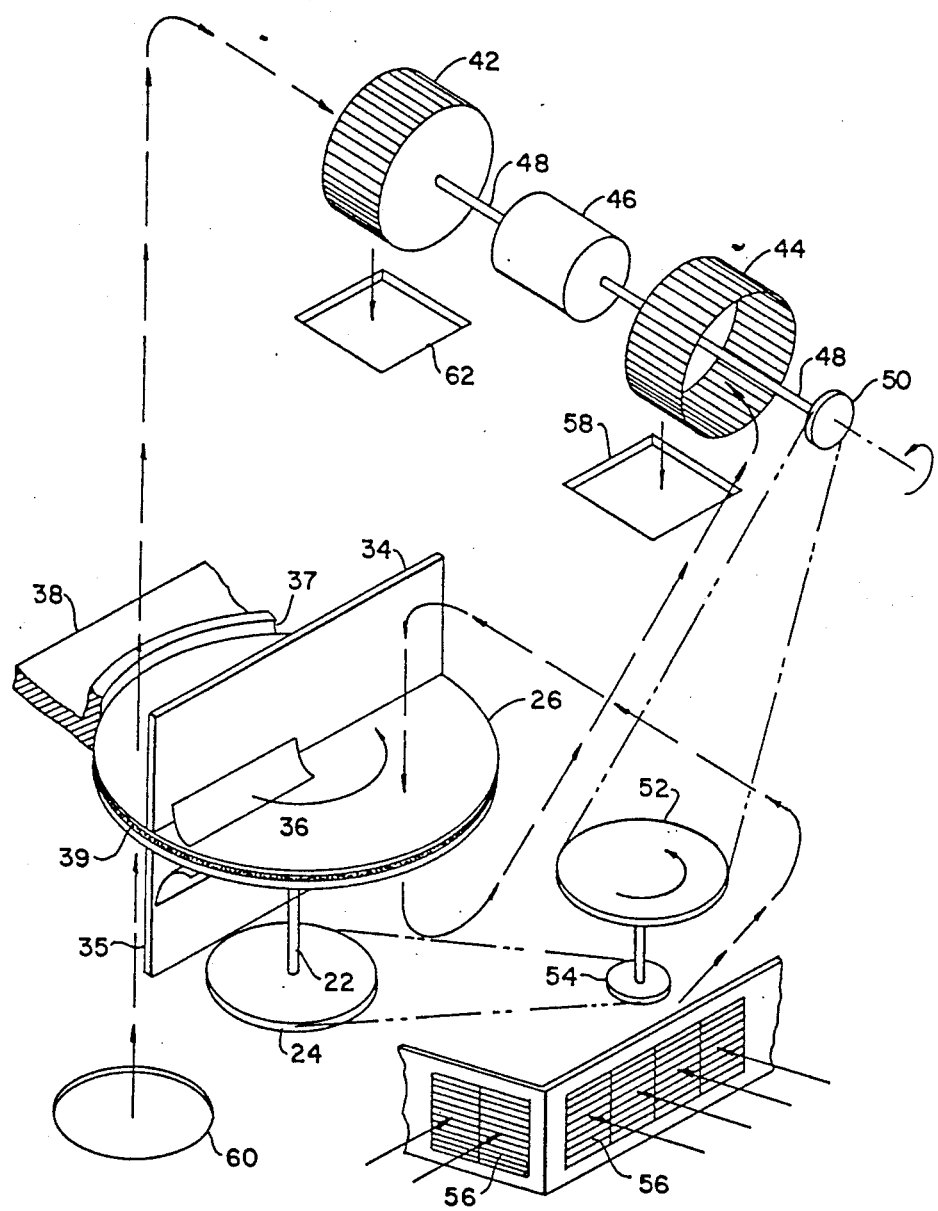
FIG. 3 is a schematic view of some of the interior components of the regenerator illustrating the air flow through the components.
Figure 4:
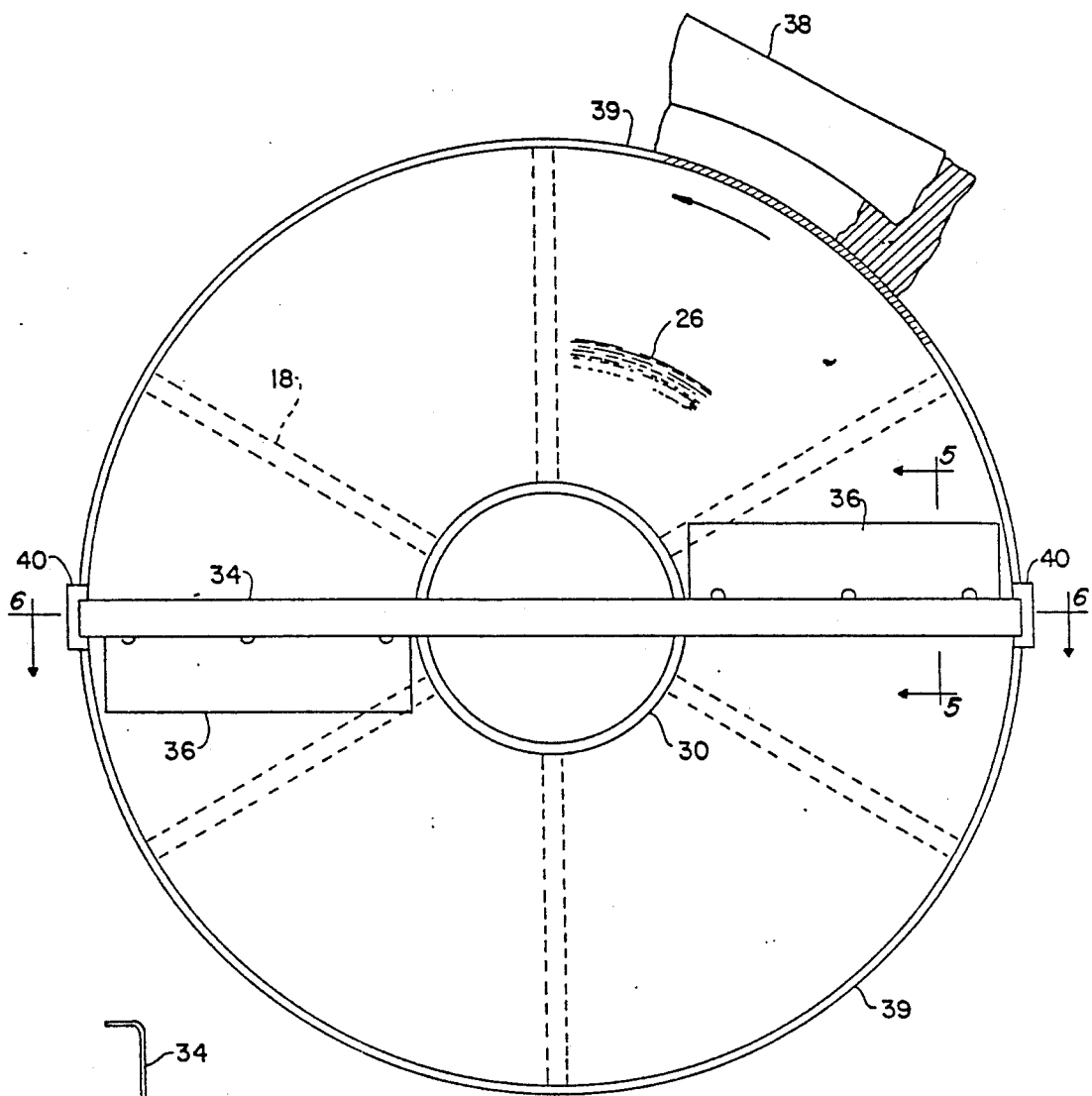
FIG. 4 is a top plan view of the regenerator matrix wheel, matrix wheel support, and matrix wheel seal assembly.
Figure 5:
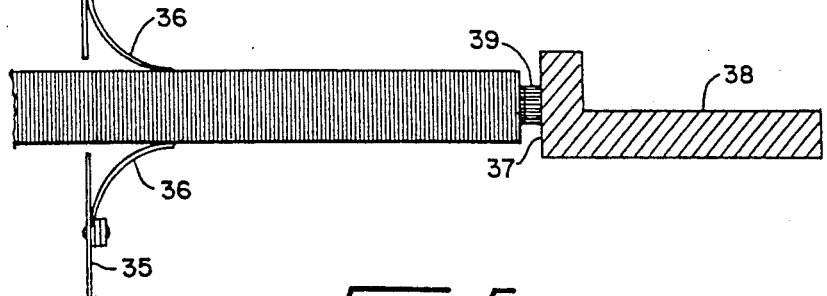
FIG. 5 is a view taken on line 5—5 of FIG. 4.
Figure 6:
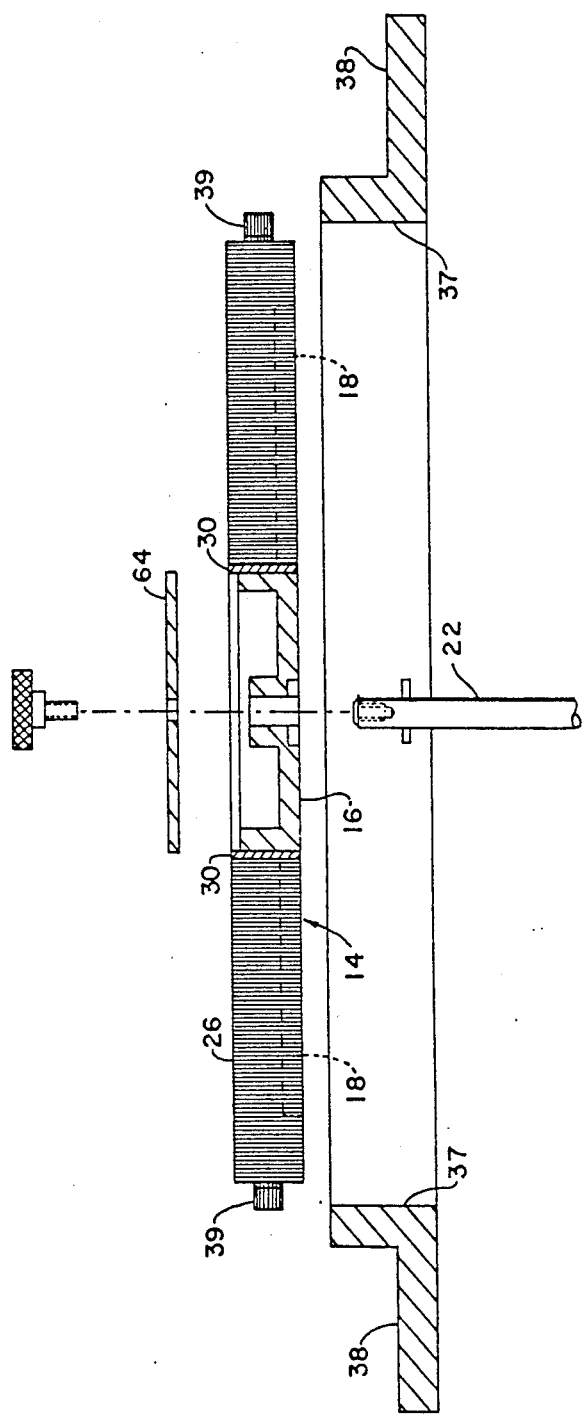
FIG. 6 is a view in section taken on line 6—6 of FIG. 4.
Figure 9:
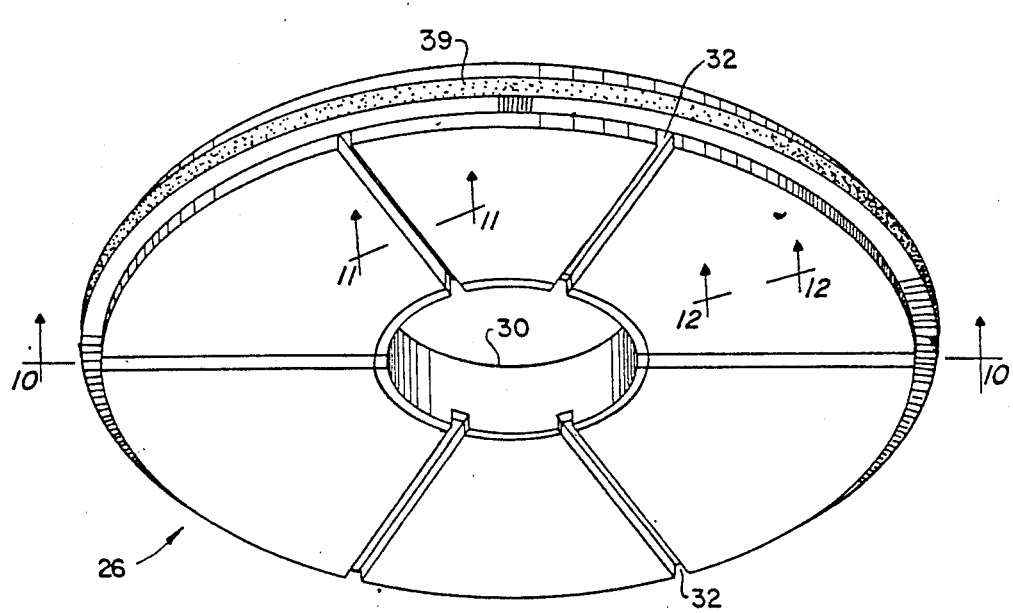
FIG. 9 is a perspective view of the matrix wheel showing the lower side thereof.
Figure 10:
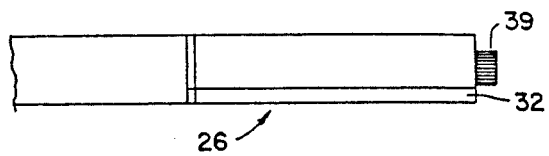
FIG. 10 is a view in section taken on line 10—10 of FIG. 9.
Figure 11:
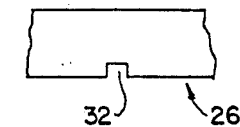
FIG. 11 is a view in section taken on line 11—11 of FIG. 9.

The operation of the device may be described by reference to FIG. 1, 2, and 3. The particular device illustrated may be utilized to ventilate a mobile home and may be mounted on the floor in a suitable cabinet, over holes in the floor positioned to be aligned with holes in the bottom of the enclosure 10, as will be described.

Air from inside the mobile home is drawn by the blower 44 into the enclosure 10 through louvers 56 down through the adjacent half of the matrix wheel 26, into the blower 44 and out of the enclosure through bottom aperture 58, from where it may be exhausted by suitable ductwork (not shown) to the outdoors.

Simultaneously outside air may be drawn by blower 42 from the outdoors through suitable ductwork (not shown) into the enclosure through aperture 60 in the bottom of the enclosure up through the other half of the matrix wheel (picking up heat left in the matrix by the outgoing air) into the blower 42 and then out of the enclosure 10 through aperture 62 into suitable ductwork (not shown) to be discharged into the interior of the mobile home at a location spaced from the intake louvers 56.

During the period of the year when the interior space is air-conditioned, the air flow is the same, however the incoming air would leave the heat of the outdoor air in the matrix, which would then be removed by the outgoing air.

Although the illustrated unit is intended for mounting on the floor of a mobile home, in some installations it must be mounted on the ceiling in an inverted position. To allow the arms 18 to properly support the matrix in such case, the hub 16 and the drive shaft 22 are so constructed that the wheel may be inverted in relation to the unit, so that the wheel may be mounted on the downwardly extending shaft with the arms 18 on the under side of the matrix.

Although the illustrated embodiment is particularly adapted for use in a mobile or manufactured home, it will be understood that a unit embodying the features of the invention may be used as a window or wall unit in any type of residence or other structure.

Since certain other changes apparent to one skilled in the art may be made in the herein described embodiments of the invention without departing from the scope thereof, it is intended that all matter contained herein be interpreted in an illustrative and not a limiting sense.

We claim:

1. In a rotary heat regenerator comprising (a) a housing including a cylindrical housing wall having a substantially circular cross section and defining a central aperture, (b) a regenerator matrix mounted in said central aperture for rotation about a central axis, said regenerator matrix having a substantially circular peripheral surface, said regenerator matrix being sized and mounted in said aperture so that said peripheral surface of said regenerator matrix is spaced from said cylindrical housing wall so as to form an annular gap therebetween, and (c) drive means couplable with said regenerator matrix for causing the latter to rotate in said central aperture, the improvement wherein said rotary heat regenerator further comprises compliant seal means attached to one of said peripheral surface and said housing wall and extending across said gap so as to lightly brush against the other of said peripheral surface and said housing wall for restricting the flow of air through said gap, said seal means comprising a pile-like material having a plurality of individual piles, said individual piles being positioned sufficiently close relative to one another so as to restrict the flow of air through said gap.

2. A rotary heat regenerator according to claim 1 wherein said pile-like material is secured to said cylindrical housing wall adjacent said peripheral surface of said regenerator matrix, further wherein said pile-like material is sized to extend away from said cylindrical housing wall so as to engage said peripheral surface so that when said regenerator matrix is caused to rotate said plurality of individual piles are flexed against said peripheral surface of said regenerator matrix.

3. A rotary heat regenerator according to claim 2 wherein said individual piles of said pile-like material are sufficiently flexible to maintain engagement with said peripheral surface of said regenerator matrix even if the width of said gap, as measured along axes extending normally to and radially outwardly from said central axis and intersecting said peripheral surface of said regenerator matrix and said cylindrical housing wall, increases or decreases as said regenerator matrix rotates due to variations in concentricity of said peripheral surface with respect to said central axis.

4. A rotary heat regenerator according to claim 1 wherein the composition of said cylindrical housing wall and said pile-like material are such that with time said pile-like material may cause some wear on said cylindrical housing wall, further wherein the composition and replacement of said pile-like material are selected so that the latter will satisfactorily restrict the flow of air through said gap even after said wear has occurred on said cylindrical housing wall.

5. In a rotary heat regenerator comprising (a) a housing including a cylindrical housing wall having a substantially circular cross section and defining a central aperture, (b) a regenerator matrix mounted in said central aperture for rotation about a central axis, said regenerator matrix having a substantially circular peripheral surface, said regenerator matrix being sized and mounted in said aperture so that said peripheral surface of said regenerator matrix is spaced from said cylindrical housing wall so as to form an annular gap therebetween, and (c) drive means couplable with said regenerator matrix for causing the latter to rotate in said central aperture, the improvement wherein said rotary heat regenerator further comprises seal means disposed in said gap and extending between said peripheral surface and said housing wall for restricting the flow of air through said gap, said seal means comprising (a) a first portion of pile-like material which is secured to said peripheral surface of said regenerator matrix and is sized to extend away from said peripheral surface toward said cylindrical housing wall and (b) a second portion of the pile-like material which is secured to said housing wall adjacent said peripheral surface and is sized to extend away from said housing wall toward said peripheral surface.

6. A rotary heat regenerator according to claim 5 wherein said first portion lies in a different plane than, and overlaps, said second portion.

7. In a rotary heat regenerator comprising (a) a housing including a cylindrical housing wall having a substantially circular cross section and defining a central aperture, (b) a regenerator matrix mounted in said central aperture for rotation about a central axis, said regenerator matrix having a substantially circular surface, said regenerator matrix being sized and mounted in said aperture so that said peripheral surface of said regenerator matrix is spaced from said cylindrical housing wall so as to form an annular gap therebetween, and (c) drive means couplable with said regenerator matrix for causing the latter to rotate in said central aperture, the improvement wherein said rotary heat regenerator further comprises compliant seal means attached to one of said peripheral surface and said housing wall and extending across said gap so as to lightly brush against the other of said peripheral surface and said housing wall for restricting the flow of air through said gap, said seal means comprising a pile-like material having a plurality of individual piles, said individual piles being positioned sufficiently close relative to one another so as to restrict the flow of air through said gap, further wherein said pile-like material (1) is secured to said peripheral surface of said regenerator matrix, and (2) is sized to extend away from said peripheral surface as to engage cylindrical housing wall so that when said regenerator matrix is caused to rotate said plurality of individual piles are flexed against said cylindrical housing wall.

8. A rotary regenerator according to claim 7 wherein said individual piles of said pile-like material are sufficiently flexible to maintain engagement with said cylindrical housing wall even if the width of said gap, as measured along axes extending normally to and radially outwardly from said central axis and intersecting said peripheral surface of said regenerator matrix and said cylindrical housing wall, increases and decreases as said regenerator matrix rotates due to variations in concentricity of said peripheral surface with respect to said central axis.

9. A rotary heat regenerator according to claim 7 wherein the composition and placement of said pile-like material is selected so that said pile-like material may function as a heat recovery matrix for air leaking through said pile-like material.

10. In a rotary heat regenerator comprising (a) a housing including a cylindrical housing wall having a substantially circular cross section and defining a central aperture, (b) a regenerator matrix mounted in said central aperture for rotation about a central axis, said regenerator matrix having a substantially circular peripheral surface, said regenerator matrix being sized and mounted in said aperture so that said peripheral surface of said regenerator matrix is spaced from said cylindrical housing wall so as to form an annular gap therebetween, and (c) drive means couplable with said regenerator matrix for causing the latter to rotate in said central aperture, the improvement wherein said rotary heat regenerator further comprises compliant seal means attached to one of said peripheral surface and said housing wall and extending across said gap so as to lightly brush against the other of said peripheral surface and said housing wall for restricting the flow of air through said gap, said seal means comprising a pile-like material having a plurality of individual piles, said individual piles being positioned sufficiently close relative to one another so as to restrict the flow of air through said gap, wherein said individual piles of said pile-like material are sufficiently flexible to maintain engagement with said cylindrical housing wall even if the width of said gap, as measured along axes extending normally to and radially outwardly from said central axis and intersecting said peripheral surface of said regenerator matrix and said cylindrical housing wall, increases and decreases as said regenerator matrix rotates due to variations in concentricity of said peripheral surface with respect to said central axis.

* * * * *

UNITED STATES PATENT AND TRADEMARK OFFICE
CERTIFICATE OF CORRECTION

PATENT NO.   :   5,002,116
DATED        :   March 26, 1991
INVENTOR(S)  :   Lawrence C. Hoagland and Donald F. Steele It is certified that error appears in the above-identified patent and that said Letters Patent is hereby corrected as shown below:

Claim 4, column 6, line 24, delete "replacement" and insert therefor -- placement --; and Claim 7, column 6, line 61, after "circular" insert -- peripheral --.

Signed and Sealed this

Twenty-ninth Day of September, 1992

Attest:

DOUGLAS B. COMER

*Attesting Officer*          *Acting Commissioner of Patents and Trademarks*